United States Patent [19]

Akisada et al.

[11] Patent Number: 4,566,767

[45] Date of Patent: Jan. 28, 1986

[54] MULTIPLE IMAGE TYPE PHOTOGRAPHING APPARATUS

[75] Inventors: Masahide Akisada; Norio Ookawa; Yuji Takamura, all of Kanagawa, Japan

[73] Assignee: Fuji Photo Film Co., Ltd., Kanagawa, Japan

[21] Appl. No.: 596,171

[22] Filed: Apr. 2, 1984

[30] Foreign Application Priority Data

Apr. 1, 1983 [JP] Japan .................................. 58-57048

[51] Int. Cl.$^4$ ............................................ G03B 29/00
[52] U.S. Cl. ...................................... 354/76; 354/123
[58] Field of Search .................................. 354/75–77, 354/123, 124, 120, 261; 355/74

[56] References Cited

U.S. PATENT DOCUMENTS

| | | | |
|---|---|---|---|
| 3,476,478 | 11/1969 | Rees | 355/55 |
| 4,033,693 | 7/1977 | Payrhammer et al. | 354/261 X |
| 4,174,895 | 11/1979 | Fermaglich et al. | 354/76 |
| 4,206,465 | 6/1980 | Tamoto et al. | 354/123 X |
| 4,285,587 | 8/1981 | Schiff et al. | 354/76 X |
| 4,325,630 | 4/1982 | Kimura et al. | 355/74 |

FOREIGN PATENT DOCUMENTS 55-60937  5/1980  Japan .................................. 354/120

Primary Examiner—John Gonzales
Attorney, Agent, or Firm—Sughrue, Mion, Zinn Macpeak & Seas

[57] ABSTRACT

A multiple image photographing apparatus in which images of different sizes can be formed on a single film sheet. A television monitor is movably mounted in a horizontal direction, while a film holding and conveying mechanism is movably mounted in a vertical direction. The amount of movements of the monitor and the film conveying and holding mechanism are determined in accordance with the selected photographing magnification. An auxiliary lens, which is mounted on a lens holder which moves along with the TV monitor, is selectively movable in and out of the optical path in accordance with the selected photographing magnification.

7 Claims, 14 Drawing Figures

MULTIPLE IMAGE TYPE PHOTOGRAPHING APPARATUS

BACKGROUND OF THE INVENTION

The present invention relates to a multiple image photographing apparatus in which a plurality of images displayed one at a time on an image displaying device such as a CRT (cathode-ray tube) are recorded on a single sheet of film. More particularly, the invention relates to a multiple image photographing apparatus employing a variable magnification system.

Recently, a multiple image photographing apparatus for photographing images displayed on a television monitor and recording such images on a sheet of film has been utilized for medical diagnostic purposes. An example of a multiple image photographing apparatus of this type is disclosed in Japanese Laid-Open Patent Application No. 60937/1980. The apparatus includes a television monitor having a display screen directed upwardly, a film conveying device disposed above the television monitor to move the film parallel to the display surface of the television monitor, and a photographing lens arranged between the film conveying device and the television monitor, with the television monitor being movable parallel to the film conveying plane.

This apparatus suffers from several drawbacks. First, photographing is carried out with the film held in a horizontal position. Therefore, the degree of flatness of the film is liable to be adversely affected due to the force of gravity, and accordingly, the developed image may be of unavoidably low quality. In addition, since exposure operations are carried out successively while the film is being moved in a horizontal plane, the area required for accommodating the apparatus is necessarily large.

In order to solve the above-described problems, the present applicant has proposed a multiple image photographing apparatus, which is described in U.S. patent application Ser. No. 477,461. The apparatus includes an image display device for displaying images to be photographed, a projecting optical system for focusing the image displayed on the picture displaying device on film, and a film conveying mechanism. A mirror is arranged in the projecting optical system, and the picture displaying device is movable horizontally while the film conveying mechanism moves the film vertically. This apparatus is advantageous in that the flatness of the film is not affected by by the force of gravity, and accordingly the quality of the developed images is improved. Moreover, the installation area of the apparatus is significantly reduced.

An object of the present invention is to improve the above-described conventional multiple image photographing apparatus. More specifically, an object of the invention is to provide a multiple image photographing apparatus in which, in addition to the above-described advantages, the magnification factor is made variable by adding a simple magnification varying mechanism to the above-described conventional multiple image photographing apparatus.

A conventional magnification varying mechanism will be briefly described. As an example, Japanese Laid-Open Patent Application No. 60971/1980 discloses a multiple image photographing apparatus in which, to vary the photographing magnification, the photographing lens is replaced and the optical path length is varied by moving the television monitor vertically. The conventional photographing lens is replaced with a lens board having lenses and shutters in a number equal to the number of images to be recorded on a single film sheet or frame. A suitable lens among the plural lenses is selected according to the desired magnification and the position of the image on the film.

However, this apparatus too involves certain drawbacks. First, since in a multiple image photographing operation using the above-described lens board images formed by different lenses are recorded on the same film sheet or frame, the photographing lenses must be strictly uniform, and accordingly the apparatus is considerably expensive. Secondly, in order to move the television monitor vertically, the necessary mechanism and its operation are intricate and the construction thereof must be rugged, and therefore the apparatus is necessarily expensive.

SUMMARY OF THE INVENTION

The multiple image photographing apparatus of the invention employs a magnification varying mechanism which, unlike the above-described conventional magnification varying mechanism, has a simple construction and is capable of providing pictures of uniformly high quality.

A specific feature of the invention resides in a multiple image photographing apparatus including an image displaying device for displaying images to be photographed, a projecting optical system for focusing the images displayed on the images displaying device onto film, and a film conveying mechanism. In accordance with the invention, a reflecting mirror and a magnification varying auxiliary lens are arranged in the projecting optical system, and the image displaying device is made movable horizontally while the film conveying mechanism is adapted to move the film vertically.

DESCRIPTION OF THE PREFERRED EMBODIMENTS

A preferred embodiment of the invention will be described with reference to the accompanying drawings.

Figure 1:
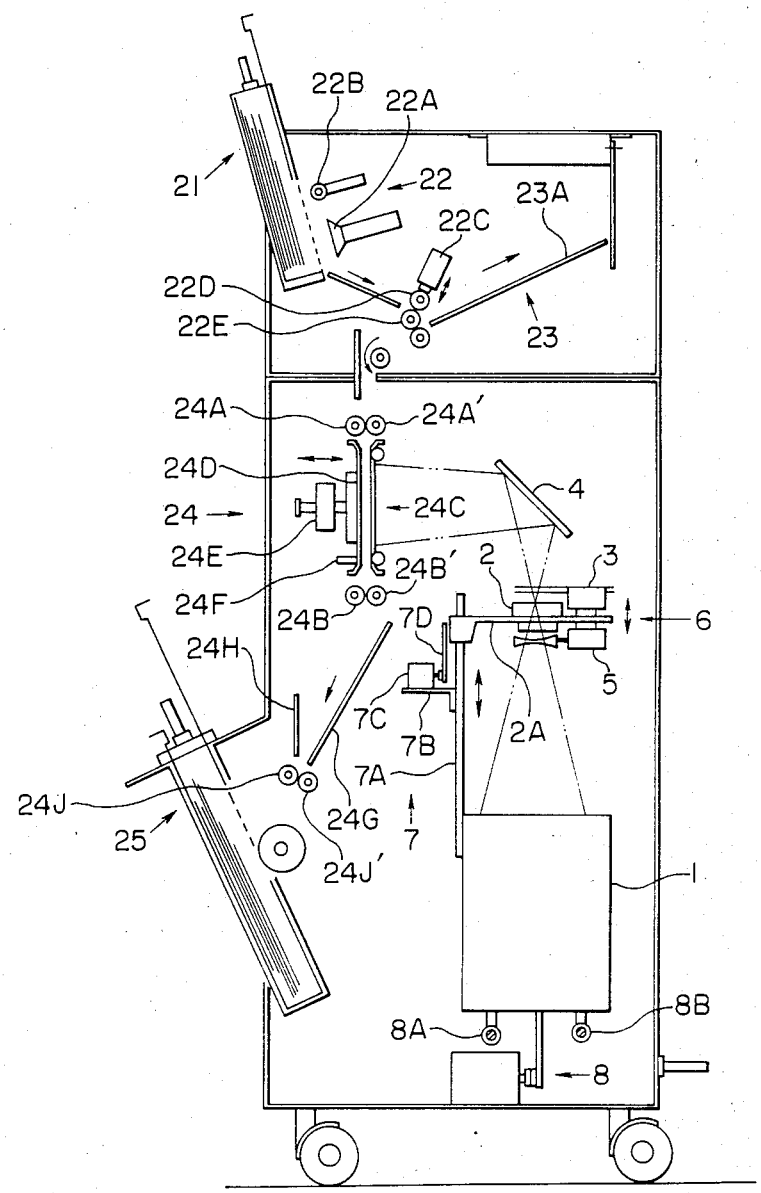
FIG. 1 is an explanatory diagram showing the arrangement of a multiple image photographing apparatus constructed according to the invention.
Figure 8:
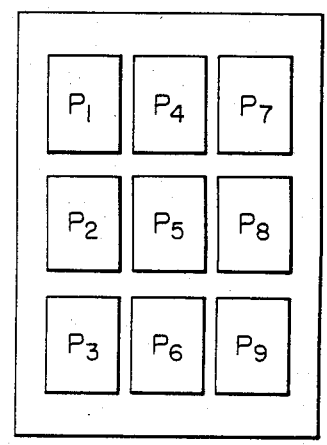
Figure 9:
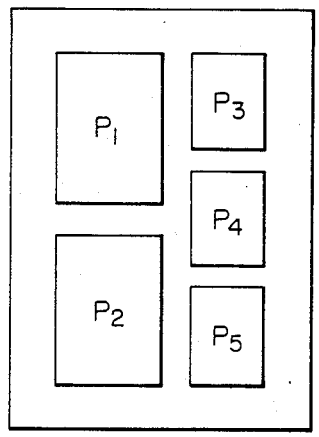
Figure 10:
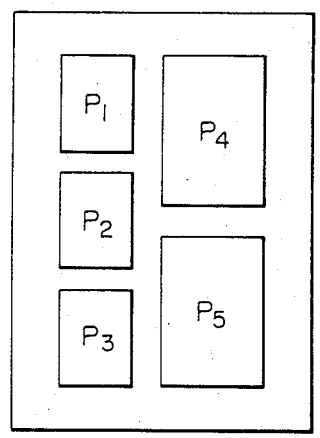

FIG. 1 is an explanatory diagram showing the arrangement of a multiple image photographing apparatus constructed according to the invention. In this apparatus, film sheets are loaded into a film supply magazine from which they are later extracted to be used for photographing. The exposed film is received by a film receiving magazine. The apparatus is so designed that four large frames of equal size (FIG. 7) or nine small frames of equal size (FIG. 8) are formed on one sheet of film, or otherwise five mixed frames including two large frames plus three small frames are formed on one sheet of film (FIGS. 9 and 10).

In FIG. 1, reference numeral 1 designates a television monitor; 2, a photographing lens; 3, a shutter device; 4, a mirror; 5, an attachment lens device; 7, a camera section moving mechanism for moving a camera section including the photographing lens 2, the shutter device 3 and the attachment lens 5 in the direction of the optical axis; and 8, a television monitor moving mechanism. Further in FIG. 1, reference numeral 21 designates the aforementioned film supply magazine; 22, a film take-out mechanism; 23, a storage section for temporarily storing film; 24, a film exposure section; and 25, the aforementioned film receiving magazine.

Figure 2:
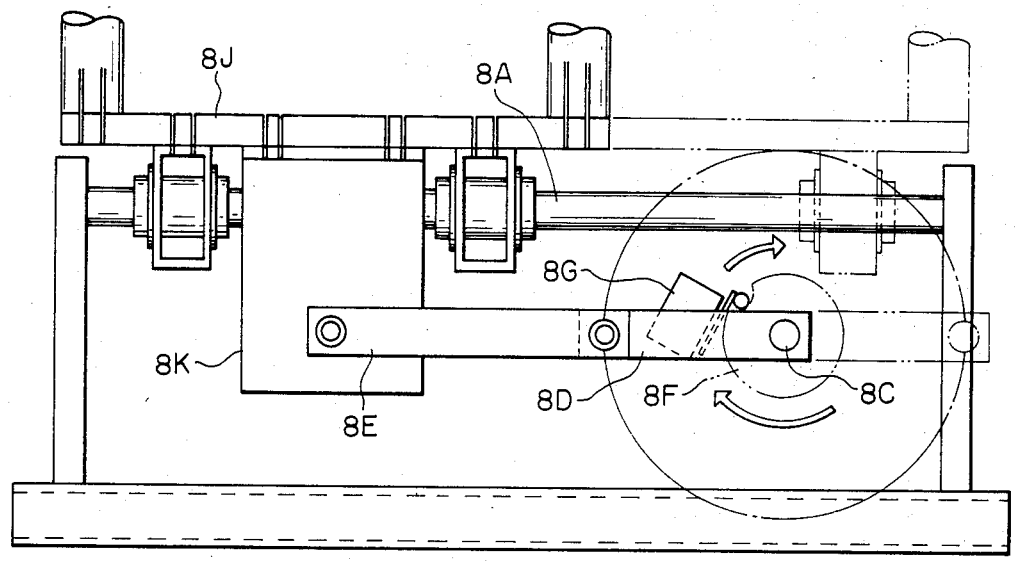
FIG. 2 is an explanatory diagram showing a television monitor moving mechanism used in the apparatus of FIG. 1.
Figure 3:
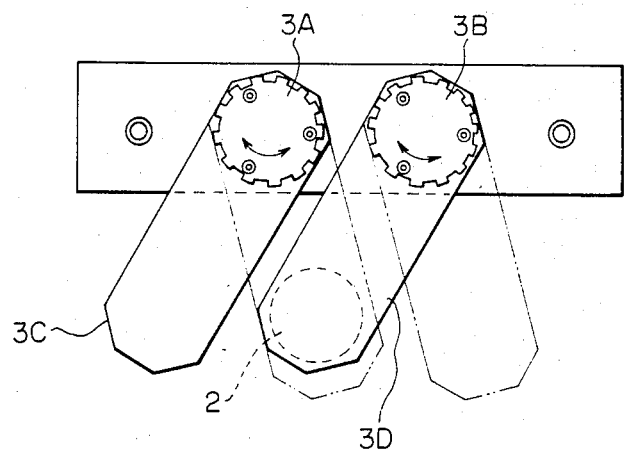
FIG. 3 is an explanatory diagram showing a shutter device used in the apparatus of FIG. 1.

The television monitor 1 includes a CRT having a display screen directed upwardly and a drive device therefor. The television monitor is moved along guide rails 8A and 8B in a direction perpendicular to the surface of the drawing by the television monitor moving mechanism 8. The television monitor moving mechanism 8, as shown in the side view of FIG. 2, is composed of a crank mechanism including a first arm 8D coupled to the shaft 8C of a pulse motor, a second arm 8E rotatably connected to the first arm 8D with a pin, and a position detecting mechanism implemented with a cam 8F coupled to the shaft 8C of the pulse motor and a limit switch 8G engaged with the cam 8F. The limit switch 8C is so positioned with respect to the cam 8F that the rotation of the pulse motor is stopped at the bottom-dead-center position of the crank mechanism. The television monitor 1 is set on a frame 8J which is movable along the guide rails 8A and 8B. The second arm 8E of the crank mechanism is rotatably connected through a pin to a bracket 8K connected to the bottom of the frame 8J. With this arrangement, when the pulse motor rotates, the television monitor 1 is movable between the top-dead-center position and the bottom-dead-center position of the crank mechanism.

For controlling the position of the television monitor 1, the bottom-dead-center position of the crank mechanism where the cam 8F is engaged with the limit switch 8G is employed as a reference position, and the distance from the reference position is defined by the number of pulses applied to the pulse motor needed to move to the reference position.

The shutter device 3 and the attachment lens device 5 are mounted on a lens holder 2A which holds the photographing lens. The aforementioned camera section 6, which includes these components, is movable on a shaft 7A connected to the television monitor 1 in the direction of the optical axis (vertically in FIG. 1) by the camera section moving mechanism 7. The mechanism 7 is composed of a motor 7C mounted on a bracket 7B fixed to the shaft 7A and a crank mechanism 7D driven by the motor 7C. The camera section 6, the camera section moving mechanism 7, and the mirror section 4 are integral with the monitor television set 1 (not shown in detail in FIG. 1), and these components are movable in a direction perpendicular to the surface of the drawing by the television monitor moving mechanism 8. In order to prevent distortion of the photographed images, the photographing lens 2 should have a long focal length of about 135 mm.

Figure 4A:
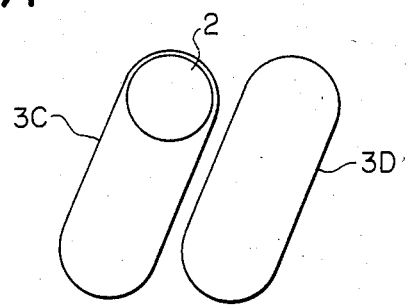
FIGS. 4A through 4D are explanatory diagrams for a description of the operation of the shutter device.
Figure 4B:
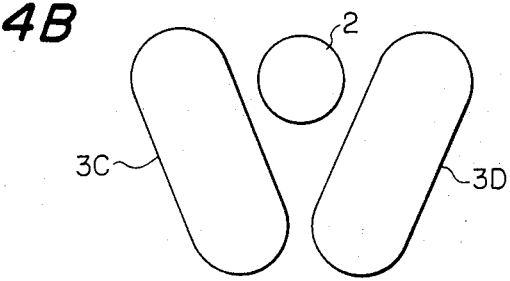
Figure 4C:
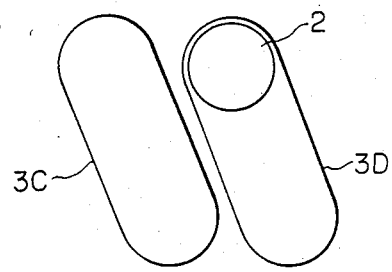
Figure 4D:
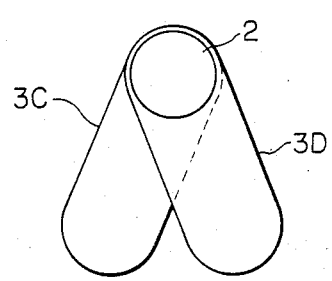

The photographing shutter device 3 includes a closing shutter 3C and an opening shutter 3D which are driven by solenoids 3A and 3B, respectively. When the solenoids 3A and 3B are not excited, the closing shutter 3C is disposed in the optical path while the opening shutter 3D is out of the optical path, as shown in FIG. 4A. In response to a shutter operating signal, the solenoid 3 is activated to retract the closing shutter 3C out of the optical path, as shown in FIG. 4B, thereby to start exposure. After a predetermined period of time, the solenoid 3B is activated to move the opening shutter 3D into the optical path, as shown in FIG. 4C, to thereby complete an exposure operation. Thereafter, the solenoid 3A is deenergized to cause the closing shutter 3C to move into the optical path, as shown in FIG. 4C, and then the solenoid 3B is also deenergized to cause the closing shutter 3D to move out of the optical path. Thus, the shutter device is restored.

Figure 5:
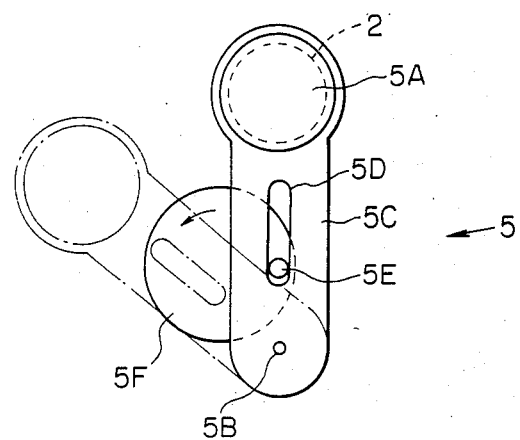
FIG. 5 is an explanatory diagram showing an attachment lens device.

The attachment lens device 5, as shown in FIG. 5, includes a lens holder 5C rotatable around a pin 5B, a cam 5F having a pin 5E engaged with an elongated hole 5D formed in the lens holder 5C, and a motor (not shown) for driving the cam 5F. The lens holder 5C holds an attachment lens 5A which is a thin concave or thin convex lens. As the motor rotates in a first direction, the cam 5F is turned in the direction of the arrow. Accordingly, the lens holder 5C, engaged through the pin 5E and the elongated hole 5D with the cam 5F, is turned until it arrives at the position indicated by the single-dot chain line in FIG. 5. That is, the attachment lens 5A is moved out of the optical path. When the motor rotates in the opposite direction, the attachment lens 5A is moved into the optical path.

The film supply magazine 21, which can accommodate, for instance, about 100 sheets of film, has a film take-out opening in one surface thereof. The opening has a light shielding cover which can be removed. The opening is large enough to receive the film suction discs 22A (FIG. 1) of the film take-out mechanism 22 (described in detail below). A magazine receiving section for receiving the film supply magazine 21 is provided with a detecting device which, for example, detects whether or not the film supply magazine 21 has been correctly inserted, and also with a detecting device which senses whether or not the light shielding cover has been pulled out. These detecting devices may be implemented with limit switches of a type generally used in film supplying mechanisms.

The film take-out mechanism 22 is composed of a plurality of film suction discs 22A coupled to a vacuum source (not shown), a film retaining roller 22B for preventing plural sheets of film from being taken up by the film suction discs 22A at one time, and a swinging mechanism (not shown) which pushes the film suction discs 22A against the film surface to cause the discs 22A to hold the film for transmission to the next position. A further detecting device 22C, provided for detecting when a plurality of sheets of film have been taken up, is positioned at the outlet of the film take-out mechanism 22. The detecting device 22C senses displacement of the film conveying rollers 22D at the outlet of the film take-out mechanism 22. However, other systems may be employed.

The temporary storage section 23 is used to temporarily store film sheets extracted by the film take-out mechanism 22 and delivered by the conveying rollers 22D and 22E. The section 23 includes a sloped film support board 23A and a pair of conveying rollers 22E and 23B used for delivering temporarily stored film to the next processing station. The support board 23A is formed of material having a low coefficient of friction so that the film can slide down the support board smoothly.

Figure 6:
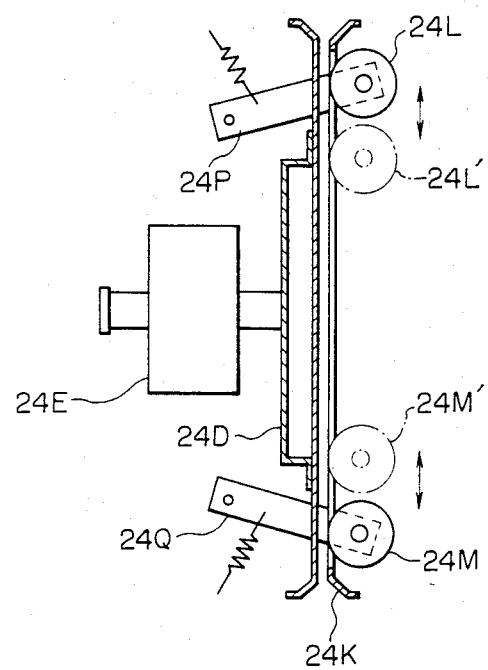
FIG. 6 is an explanatory diagram showing a photographing mask used in the apparatus of FIG. 1.

The film exposure section 24 (FIG. 5) has two pairs of conveying rollers 24A, 24A' and 24B, 24B' adapted to receive the film and to move it in a manner described below. The section 24 further includes a photographing mask unit 24C and a film pressure plate 24D positioned between the two pairs of conveying rollers. The photographing mask unit 24C, as shown in FIG. 6, is composed of a stationary mask 24K having an opening large enough to receive two frames arranged horizontally in the case of four- or five-frame photographing, and movable masks 24L and 24M including rollers which are movable in the opening to the positions 24L and 24M corresponding to the picture size for four-frame photographing and to the positions 24L' and 24M' corresponding to the picture size for nine-frame photographing. Movable lever members 24P and 24Q, which swingably support the movable masks 24L and 24M, are moved away from each other, thus being normally positioned as indicated at 24L and 24M. A wire drive mechanism (not shown) or the like is used to turn the levers 24P and 24Q against the force of the springs so that the masks 24L and 24M are moved towards each other.

With the stationary mask 24K and the movable masks 24L and 24M constructed as described above, when the television monitor 1 is moved, it is unnecessary to move the photographing mask 24C, and hence the film is maintained sufficiently flat. The film pressure plate 24D is connected to a pressure plate driving solenoid 24E secured to the body of the apparatus. Upon excitation, the solenoid 24E moves the pressure plate 24D towards the photographing mask 24C to thereby maintain the film flat. When the solenoid 24E is deenergized, the pressure plate 24D is retracted by a spring (not shown) to provide a gap between the pressure plate and the photographing mask 24C so that the film can be smoothly extracted.

In FIG. 1, 24F designates a film position reference sensor. The sensor 24F detects the front edge of the film delivered from above to thereby stop the movement of the film. The sensor is also used to control the movement of the film through a predetermined distance with the stop position as a reference after one frame has been exposed to position the film for the next exposure operation.

Guides 24G and 24H and a pair of conveying rollers 24J and 24J' for conveying film which has been delivered out of the film exposure section 24 into the film receiving magazine 25 are provided below the section 24.

The film receiving magazine 25 can accommodate about 100 sheets of film, and has openings with light shielding covers in both surfaces. The sheets of film are received through one of the openings and taken out through the other opening for developing. That is, the structure of the film receiving magazine permits a so-called "first-in first-out" processing operation.

Figure 11:
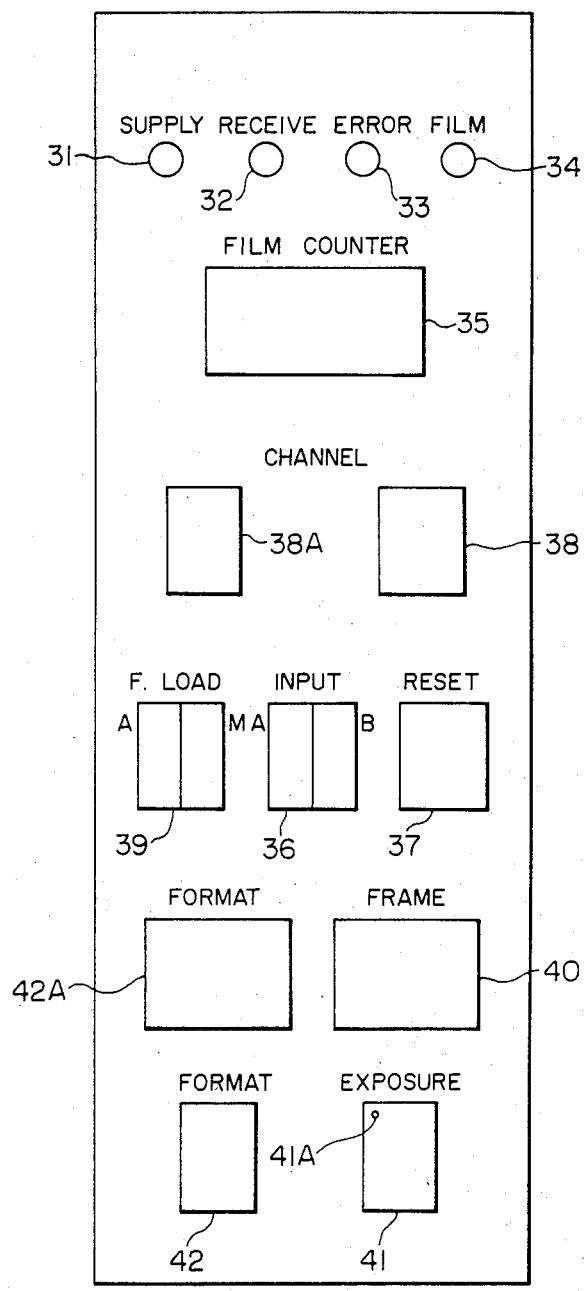
FIG. 11 is an explanatory diagram showing a control unit used with the apparatus of the invention.

In general, a multiple image photographing apparatus of this type is operated while the operator is observing the monitor of a diagnostic apparatus such as an X-ray CT diagnostic apparatus or an ultrasonic diagnostic apparatus, and therefore the multiple image photographing apparatus unit generally must be remotely controlled. FIG. 11 shows a remote control unit for the multiple image photographing apparatus of the invention. The remote control unit includes a holding magnet so that it can be installed at any desired position. In FIG. 11, reference numeral 31 designates a display lamp for indicating the fact that the film supplying magazine has been properly positioned, the light shielding cover has been pulled out, and hence that film sheets can be taken out; 32 a display lamp for indicating the fact that the film receiving magazine has been properly positioned, the light shielding cover on the film receiving side has pulled out, and the film receiving magazine is ready for receiving film; 33, an error display section; and 34, a display lamp for indicating the fact that a film sheet to be used for the next exposure operation has been received in the temporary storage section 23. Further in FIG. 11, reference numeral 35 designates the display section of a counter used for indicating the number of film sheets used; 36, a switch for selecting one of two diagnostic apparatuses which can be connected to the apparatus of the invention; 37 a reset switch; 38 a switch for selecting from among a plurality of photographing condition channels one which conforms to the photographing picture characteristics and the film being used; 38A, the display section for the switch 38; 39, a switch for selecting one of two film supplying modes, namely, an automatic continuous film supplying mode (automatic feed mode) and a manual sequential film supplying mode (manual feed mode); 40, an exposure switch; 42, a format selecting switch for selecting one of the photographing formats shown in FIGS. 7 through 10; and 42A, a display section for the switch 42. The displayed contents of the display section 42A are, for instance, "4", "9", "5" and "5B", corresponding to the photographing formats shown in FIGS. 7, 8, 9 and 10, respectively.

The operation of the apparatus thus constructed will be described with reference to an example where the photographing format of FIG. 10 ("5B"), including two different picture sizes, is selected.

In preparation, film sheets are loaded into the film supply magazine 21 and its light shielding cover is put in position. The film supply magazine 21 is inserted into the magazine receiving section, and then the light shielding cover is pulled out. The film receiving magazine 25 is then readied and its film receiving opening is opened.

Under this condition, the power switch of the apparatus is turned on, and initial setting is carried out as follows: The television monitor 1 is set at a position corresponding to a picture position $P_1$ on the film. Operating elements such as the film suction disc 22A of the film take-out mechanism 22 are set in place, and the vacuum pump is operated. All the indicating devices of the remote control unit are reset.

One of the diagnostic apparatuses is selected by operating the selecting switch 36 of the remote control unit, and at the same time one of the present photographing condition channels which conforms to the picture characteristic of the diagnostics apparatus and the characteristic of the film used is selected by operating the selecting switch 38. The automatic feed mode or the manual feed mode is selected by operating the switch 39 to supply film sheets in the corresponding mode. It is confirmed by observing the display section 42A that the desired photographing format has been set. In this case, it is confirmed if the display section 42A displays "5B". If not, the format "5B" is selected by operating the format selecting switch 42. When the format selection has been carried out as described above, the camera section moving mechanism 7, the attachment lens device 5, the television monitor moving mechanism 8 and the photographing mask 24 are positioned for the first photographing frame ($p_1$ in FIG. 10) in the selected photographing format. The film position is then changed if necessary.

Figure 7:
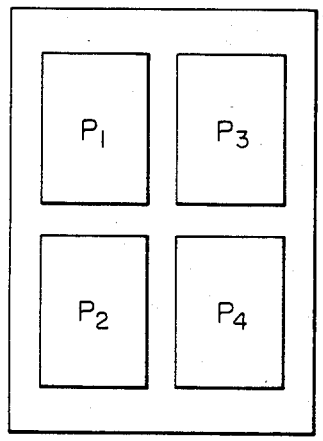
FIGS. 7 through 10 are explanatory diagrams showing examples of photographing position arrangements on a film sheet.

The set-up of the various operating mechanisms will be described with reference to the case where the four-frame photographing format of FIG. 7 is changed over to the five-frame photographing format of FIG. 10. The camera section moving mechanism 7 moves the camera section 6 upwardly from the position used for the four-frame format, the attachment lens device 5 moves the attachment lens 5A into the optical path, and the television monitor moving mechanism 8 moves the television monitor 1 to a position corresponding to the image frames $p_1$ through $p_3$ in FIG. 10 from a position corresponding to the frames $p_1$ and $p_2$ in FIG. 7. The photographing mask 24C is moved to a position corresponding to the small size images. In the case where a film sheet has already been delivered to the film exposure section 24, its position is changed from a position corresponding to the photographing frame $p_1$ in FIG. 7 to a position corresponding to the photographing frame $p_1$ in FIG. 10 by the pair of conveying rollers 24A and 24A'. Thus, preparation for starting the desired photographing operation has been accomplished.

Next, the photographing operations will be described with reference to the case where the film is automatically fed. First, the operator depresses the exposure switch 41 of the remote control unit. This operation is required only when the apparatus is being started. As a result, the film take-out mechanism 22 operates to remove a film sheet from the film supply magazine 21 and to deliver it through the temporary storage section 23 to the reference position in the film exposure section 24. In the case of the automatic feed mode, a film sheet is automatically delivered when the preceding film sheet held at the film exposure section 24 is used, for instance, when a picture for the first position $P_1$ has been taken, and the film thus delivered is temporarily stored at the storage section 23. Thus, in the continuous photographing mode, the waiting time for replacing the film is greatly reduced.

When a film sheet has been set at the photographing position by operation of the exposure switch, the operator depresses the exposure switch 41 of the remote control unit to record images while observing the monitor of the diagnostic apparatus. As a result, the same image that is displayed on the CRT of the television monitor 1 is photographed and recorded on the film at the position $P_1$.

When the image has been photographed and recorded on the film at the position $P_1$ as described above, the pulse motor (not shown) is driven to operate the pairs of conveying rollers 24A, 24A' and 24B, 24B' to convey the film sheet a predetermined distance. As a result, the photographing position is now the second position $P_2$ on the film sheet. The display lamp 41A coupled to the exposure switch 41 informs the operator of this condition.

After confirming the fact that the display lamp 41A has been turned on, the operator carries out a photographing operation for the position $P_2$. Similarly, a photographing operation for the position $P_3$ is carried out.

When the photographing operation for the position $P_3$ has been accomplished, the following operation, which includes an image size change, is carried out. In this case, images of the four-frame size are recorded. To do this, the camera section moving mechanism 7 moves the camera section 6 downwardly from the position which had been used for nine-frame photographing, and the attachment lens device 5 retracts the attachment lens 5A out of the optical path. Further, the television monitor moving mechanism moves the television monitor from its position corresponding to the photographing positions $P_1$ through $P_3$ in FIG. 10 to the position provided for the photographing positions $P_4$ and $P_5$. Also, the photographing mask 24C is moved to the position used for the large size picture, and the pair of conveying rollers 24A, 24A' moves the film to the position for the photographing position $P_4$ indicated in FIG. 10. Thus, a large size image can be photographed and recorded on the film sheet at the position $P_4$.

When an image has been recorded on the film sheet at the position $P_4$, similar to the case where an image has been recorded on the film sheet at the position $P_1$, the film sheet is moved to the photographing position $P_5$. After an image has been photographed and recorded on the film sheet at the position $P_5$, the film sheet is delivered from the film exposure section 24 to the film receiving magazine while being guided by the guides 24C and 24H. At the same time, the camera section moving mechanism 7, the attachment lens device 5, the television monitor moving mechanism 8 and the photographing mask 24C are set to positions appropriate for the small size images for the photographing position $P_1$ in FIG. 10, being moved in a similar manner to the above-described case. Simultaneously with the delivery of the film sheet from the film exposure section 24 or a certain period of time thereafter, the next film sheet from the temporary storage section 23 is delivered to the position where a small size photographing operation can be carried out for the position $P_1$ (FIG. 10). In association with the above-described film sheet replacing operation, the photographing frame number displayed by the display section 40 of the remote control unit is restored to one. The apparatus is now ready for the next photographing operation.

If the photographing format "5B" is employed, the above-described operations are carried out again. On the other hand, if a photographing format different from "5B" is used, the appropriate photographing conditions are set by specifying the new photographing format.

The operation of the apparatus has been described with reference to the case where film sheets are automatically fed. However, in the case where the number of film sheets for photographing is relatively small, manual feeding can be employed. In the manual feeding mode, with the conditions of the film setting operation effected by the first operation of the exposure switch employed as a reference, no film is temporarily stored in the temporary storage section 23.

The types of errors which can be displayed by the error display section 33 are as follows: (1) the film take-out mechanism 22 cannot satisfactorily suck and retain the film to extract it; (2) the film cannot be smoothly moved from the temporary storage section 23 to the exposure section 24; (3) the film cannot be smoothly moved from the exposure section 24 to the film receiving magazine; (4) in the exposure section 24, the film cannot be smoothly moved to the desired photographing position; and (5) the television monitor 1 cannot be smoothly moved. The types of displayable errors are not limited to these particular examples, however.

In the above-described embodiment, film sheets are supplied to the apparatus from the film supply magazine 21. However, instead of the magazine 21, a single-sided or double-sided film cassette can be used. In that case, a cassette moving mechanism, such as the one disclosed by aforementioned U.S. patent application Ser. No. 477,461, may be utilized so that the film is moved together with the cassette to perform multiple image photographing.

Sequential control for the above-described operations may be achieved utilizing combinatorial logic circuits, or such may be carried out using programmed control with a microcomputer or the like.

The film counter 35 of the remote control unit may employ a count-down technique whereby the number of film sheets loaded into the film supply magazine is set in the film counter and the count value is decremented by one whenever a film sheet is used.

In the above-described embodiment, only two sizes of images have been mentioned. However, the dimensions of the images may be determined as desired, and in addition, images of more than two sizes may be employed.

Two diagnostic apparatuses can be connected to the photographing apparatus of the invention through the input terminals as described. The input terminals may be utilized to receive the video signal and the synchronizing signals separately, thereby to improve the quality of the picture which is displayed on the CRT of the television monitor 1. The conditions set in the photographing condition channel may include negative image, positive image, contrast, brightness and exposure time.

Among the display sections of the remote control unit, one may be provided with an alarm such as a buzzer so that an audible warning signal is generated. In the case where it is necessary to indicate a plurality of states individually as in the error display section, they may be distinguished from one another by using different types of displays and warning signals.

As is apparent from the above description, according to the invention, in a multiple image photographing apparatus having an image displaying device for displaying images to be photographed, a projecting optical system for forming the images displayed on the picture displaying device on a film sheet, and a film conveying mechanism, a mirror and a magnification varying auxiliary lens are arranged in the projecting optical system. The picture displaying device is movable in the horizontal direction while the film conveying mechanism moves the film in the vertical direction. With this construction, the invention provide a multiple image photographing apparatus having a variable magnification, which is simple in construction, and which provides photographed image of high quality.

We claim:

1. A multiple image photographing apparatus comprising:
    a picture displaying device for displaying an image to be photographed;
    a projecting optical system for forming the image of a picture displayed on said picture displaying device on a film sheet; and
    a film conveying mechanism for conveying film sheets from storing means to a photographing position;
    a mirror arranged on an optical axis of said projecting optical system and a magnification changing auxiliary lens selectively movable into alignment with said optical axis;
    means for moving said picture displaying device in a horizontal direction through a distance determined in accordance with a selected photographing magnification;
    means for moving said film conveying mechanism to move said film at said photographing position in a vertical direction through a distance determined in accordance with said selected photographing magnification;
    means for selectively positioning said lens in alignment with or away from said optical axis in accordance with said selected photographing magnification, and means for masking said film sheet at said photographing position with a mask size determined in accordance with said selected photographing magnification.

2. The multiple image photographing apparatus of claim 1, wherein said projecting optical system and said magnification changing auxiliary lens are mounted on a primary lens holder, and further comprising means for selectively positioning said primary lens holder in alignment with said optical axis.

3. The multiple image photographing apparatus of claim 2, wherein said means for selectively positioning said primary lens holder in alignment with said optical axis comprises a shaft rigidly affixed to said picture displaying device, a motor, and a crank mechanism for moving said primary lens holder along said shaft in response to rotation of said motor.

4. The multiple image photographing apparatus of claim 3, wherein said means for selectively positioning said auxiliary lens on or away from said optical axis comprises an auxiliary lens holder, said auxiliary lens being positioned at one end of said auxiliary lens holder, the other end of said auxiliary lens holder being pivotally mounted to said primary lens holder, said auxiliary lens holder having a slot formed therein; a rotary cam having a pin slidably fitted within said slot in said auxiliary lens holder; and means for selectively rotating said cam.

5. The multiple image photographing apparatus of claim 3, further comprising shutter means mounted on said primary lens holder for selectively opening and blocking a light path through said projecting optical system.

6. The multiple image photographing apparatus of claim 5, wherein said shutter means comprises first and second shutter blades, each having one end rotatably mounted at a position at one side of said optical axis, and solenoid drivers for selectively positioning said first and second blades on and away from said optical axis.

7. The multiple image photographing apparatus of claim 1, wherein said masking means comprises a pair of movable rollers mounted on a member holding said film sheet at said photographing position.

* * * * *